INVENTORS
JOHN J. O'BRIEN
PATRICK J. DRONEY

BY Metro Kalimon
ATTORNEY

INVENTORS
JOHN J. O'BRIEN
PATRICK J. DRONEY
BY
Metro Kalimon
ATTORNEY

3,370,104
SEALING COMPOSITIONS CONTAINING A MIXTURE OF EPOXY RESINS AND A LIQUID RUBBER

John J. O'Brien, Watertown, and Patrick J. Droney, Arlington, Mass., assignors to W. R. Grace & Co., Cambridge, Mass., a corporation of Massachusetts
Filed June 22, 1964, Ser. No. 376,764
6 Claims. (Cl. 260—837)

ABSTRACT OF THE DISCLOSURE

Thermosetting sealing compositions are prepared containing 12 to 20 parts of a polyglycidyl ether of bisphenol A, 88 to 80 parts of an epoxy derivative prepared by reacting the above epoxide with ethylene glycol, and 19 to 30 parts of a liquid rubber exemplified by butadiene-acrylonitrile copolymers, polyurethanes, polysulfides and polychloroprene. A curing agent, and fillers, may also be present. In an example 12 parts of a polyglycidyl ether of bisphenol A are combined with 88 parts of the above epoxide reacted with ethylene glycol, 46 parts magnesium silicate, 10 parts 65% butadiene–35% acrylonitrile copolymer and 6 parts fine size silica. The mixture was cured at room temperature with 50 parts of the reaction product of equimolar amounts of tall-oil fatty acid and tetraethylene pentamine for 35 hours.

This invention relates to sealing compositions. In a particular aspect it relates to compositions suitable for use as sealants for metal-lined fiber drums which improve the strength, flexibility, adhesion and impact resistance of said drums.

Commercial practice includes the use of either all-metal drums or all-fiber drums for shipping purposes. Fiber drums are limited as to the type of materials that may be packaged therein. Metal drums are much more versatile because of their strength and chemical resistance to packaged materials. The disadvantage of using metal drums is economics. By combining metal and fiber cylinders, the advantages of using each type of drum are cumulated. While the composite structure does not allow for the complete substitution of all-metal drums, it does, nevertheless, extend the uses to which the fiber drums can be put.

Metal-lined drums consist of a composite of an outer shell of fibrous material, such as compressed kraft paper and a metal insert. The two components are joined together at their respective ends by metal lids. The composite drum is fabricated by rolling sheets of kraft paper using water glass, for example, as an adhesive to combine a plurality of paper plies until the desired thickness is obtained. Rolling is carried out with a device which gives the compressed paper a cylindrical shape.

A cylindrical metal insert is fabricated to a size that fits snugly within the paper cylinder and is prepared in a manner similar to the manufacture of can bodies. In general, the cylinder is formed from a blank metal sheet, such as steel or black iron, the longitudinal ends of which are bent to form hooks which join together and are pressed into a seam. To insure a satisfactory seal in the seam, it is the usual practice to incorporate a sealant to prevent leakage.

The metal cylinder is inserted into the paper cylinder and a metal hoop is placed over one end of the composite which serves to join a lid and the body portion into a unitary drum. One of the lids is provided with a closeable opening through which contents are placed into and removed from the drum. The hoop is hooked over the edge of the fiber cylinder and the assembly is placed in a machine where a circumferential groove is formed around the drum body and the hoop a short distance from the free edge of the cylinder. A lid is placed to rest on the groove within the drum and a sealing composition is applied between the edge of the lid and the cylindrical metal insert. The assembly is then placed in a press and the components are joined by double seaming the metal and fiber cylinder walls, the hoop and the lid. The sealing composition is locked in the seam and cures to a solid within 24 to 30 hours at room temperature. The aforementioned steps of drum assembly are repeated for the opposite side.

Conventional sealants have not proved satisfactory in composite metal-fiber drums as they do not provide sufficient adhesion to the components used in their manufacture. The present invention, therefore, provides a sealing composition for such drums which obviates the disadvantages of the prior art sealants with respect to adhesion. The composition of this invention comprises essentially an epoxy resin combined with a rubber which improves the adhesive properties of the composition. The composition is thermosetting in character and includes a curing agent for the epoxy resin, such as an amine. It may be modified by the inclusion of conventional additives, such as fillers for cost reduction, viscosity control agents, and other additives which may be required to modify the properties of the composition. The composition endows the drum with sufficient shear strength, impact resistance, flexibility and adhesion.

Figure 1:
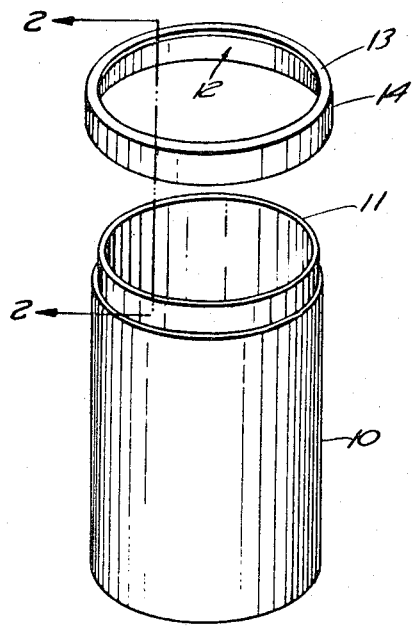
FIG. 1 is a perspective view of the drum components arranged in telescopic relationship.
Figure 2:
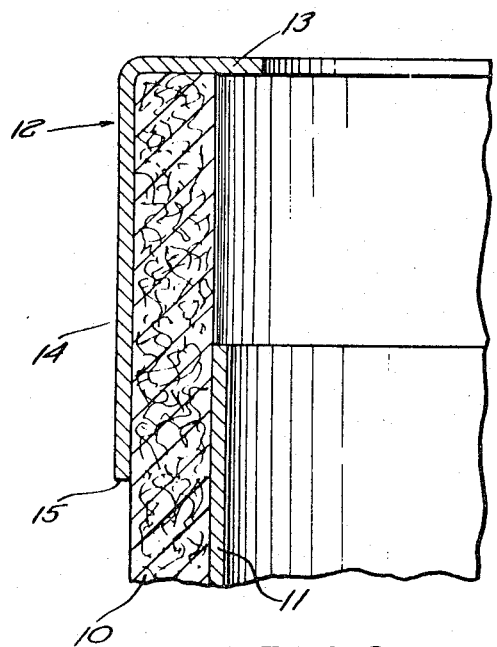
FIG. 2 is a cross-sectional view taken on a line 2—2 of FIG. 1 in which the drum components are shown in assembled position.

Referring to the drawing, particularly FIG. 1, the drum is formed by first providing a cylinder 10 of fibrous material, such as compressed kraft paper. A metal cylinder 11, of shorter length than the fibrous cylinder 10 is then inserted into frictional contact with the inner wall of the fibrous cylinder and resides a distance inwardly from each of the open ends of the fibrous cylinder. A metal hoop, shown generally at 12, consisting of a top inwardly-directed flange 13 and a skirt 14 depending from the outer perimetrical margin of the flange 13 is disposed over and circumscribes the fibrous cylinder. The skirt 14 is of such length as to depend only over a portion of the fibrous body as indicated by the terminal margin 15 of the skirt so that the outer center portion of the fibrous cylinder is exposed.

Figure 3:
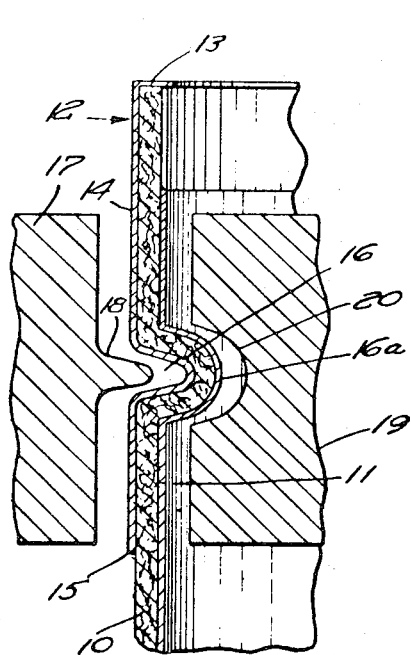
FIG. 3 is a cross-sectional view similar to FIG. 2 showing the formation of a groove in the drum body.

After both cylinders and the hoop have been assembled, a circumferential groove 16 is formed in the outer surface of the drum body at a point intermediate the flange 13 and the terminal margin 15 of the skirt 14, as illustrated in FIG. 3. The groove is formed by a roll 17 having a rib 18 projecting from its side. A chuck 19 having a channel 20 in its side is disposed within the drum body and is adapted to mate with rib 18. In forming the groove, the rib 18 of the roll 17 is steadily forced against the skirt 14 whereby the composite cylinder walls at this point are urged into the channel 20 and thereby assume the arcuate configuration of the channel in joined relationship.

Figure 4:
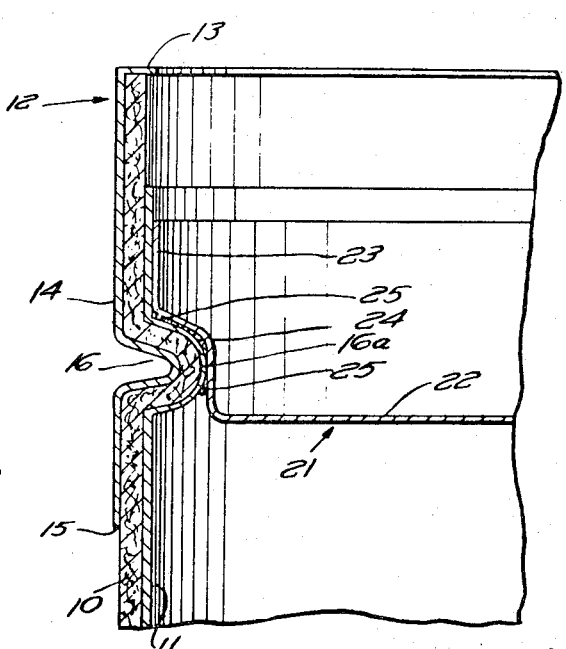
FIG. 4 is a cross-sectional view showing a lid disposed within the container and seated on the projected portion of the groove.

After the groove has been formed, a lid 21 (FIG. 4)

is seated on the projected portion of the groove 16 within the drum body. The lid 21 consists of a disc 22 and an upwardly directed rim 23 integrated with curved section 24. The sealing composition 25 of this invention is interposed between the curved section 24 of the lid and the inward projection 16a of the groove 16. The composition may be applied directly to the external surface 16a of the projected portion of groove 16 or it may be applied to the external surface of the curved section 24 of the lid 21 before the parts are brought together.

Figure 5:
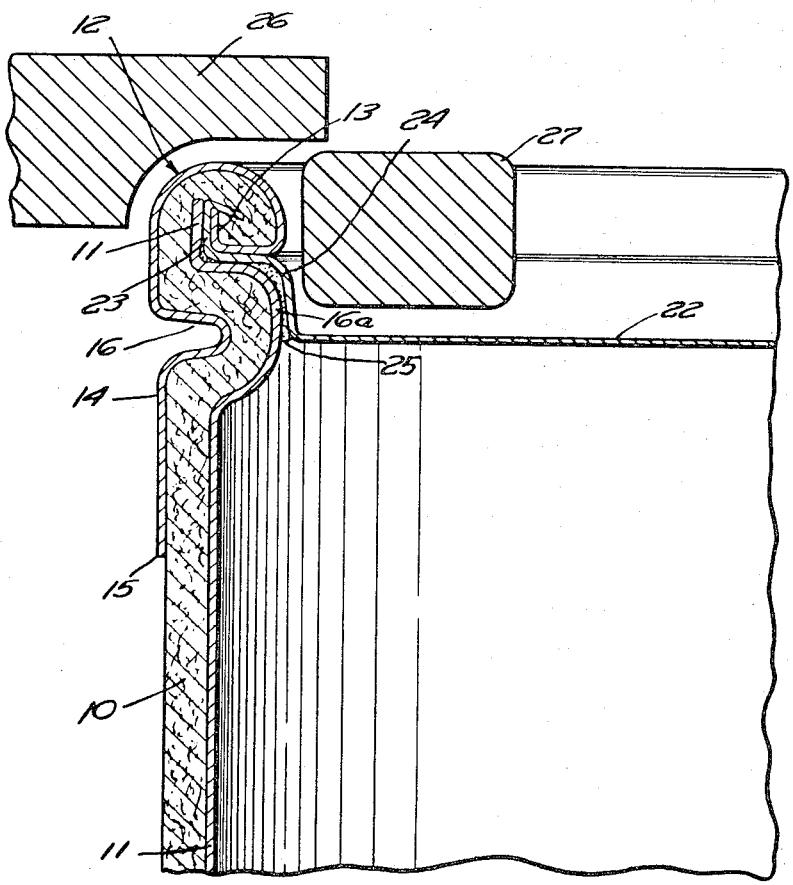
FIG. 5 is a cross-sectional view showing the drum components assembled in double seamed relationship.

All components are thereafter double seamed to enclose one end of the drum body. This is illustrated in FIG. 5 where a second roll 26 urges the top portion of the assembly inwardly against a second chuck 27. The roll is rotated circumferentially at a high speed and is brought to bear with a steady pressure against the wall of the drum assembly. The upper face of the roll is grooved and just clears the top face of the chuck, and as the roll is pressed against the composite drum wall, the flange 13 of the hop is bent initially and is tucked underneath the rim 23 of the lid 21 to form a hook. When the seam has been completed, the flange 13 of the hoop 12 is hooked into the seam, and the rim 23 of the lid 21 which resides between the flange 13, hooks over the upper edge of the flange. During the seaming operation, the sealing composition 25 is forced into close contact between the curved section 24 and the inward projection 16a of the grooved section of the metal cylinder 11. After a prescribed period of time, depending on the curing conditions, the liquid sealing composition cures to an infusible solid and provides an effective seal between the lid and other drum components.

The opposite end of the drum is enclosed in the same manner with a lid and hoop by grooving the side wall and thereafter enclosing the drum by seaming the lid and hoop to the drum body. Similarly, the sealing composition is placed between the rim of the lid and the cylindrical metal insert.

In general, the liquid compositions of this invention may be prepared by using a single epoxy resin or a mixture of epoxy resins and blending the bulk filler with the resin until a homogeneous mixture is obtained. The rubber component is added and continuously stirred to maintain the mixture in a homogeneous state. Finally, the viscosity control agent is added in amount sufficient to provide the desired viscosity.

The epoxy resins which are employed in the composition are those derived by reacting a dihydric phenol and an epihalohydrin. Suitable reactants include bis(4-hydroxyphenyl) dimethyl methane and epichlorohydrin. Other suitable dihydric phenols include resorcinol; 1,1-bis(4-hydroxyphenyl) ethane; 1,1-bis(4-hydroxyphenyl) propane; 1,1-bis(4-hydrovyphenyl) butane; 2,2-bis(4-hydroxyphenyl) butane and 1,1-bis(4-hydroxyphenyl) 2-methyl propane.

Typical epoxy resins are those having an epoxy equivalent weight of between about 170 and 210. Illustrative commercial resins which are suitable in the practice of this invention include the following:

| Epoxy Resin | Epoxide Equivalent Weight | Viscosity (cps. at 25° C.) |
| --- | --- | --- |
| Epi-Rez 510 | 180-200 | 10,000-16,000 |
| Epon 828 | 180-195 | 10,000-16,000 |
| D.E.R. 336 | 186-192 | 11,000-14,000 |
| Epi-Rez 507 | ~194 | ~550 |
| D.E.R. 336 | 182-192 | 4,000-8,000 |
| Epon 820 | 180-195 | 4,000-10,000 |

Each of the above resins is prepared by the reaction of epichlorohydrin and bis(4-hydroxyphenyl) dimethyl methane.

An effective epoxy resin is a mixture of Epi-Rez 510 and Epi-Rez 507. Epi-Rez 510 is obtained by reacting epichlorohydrin and bis(4-hydroxyphenyl) dimethyl methane. Epi-Rez 507 is the reaction product of Epi-Rez 510 and ethylene glycol. The latter resin lends flexibility to the composition but must be used in controlled amounts. It has been found that the ratio of Epi-Rez 510 to Epi-Rez 507 may vary from 20/80 to 12/88 parts by weight with good results. When the quantity of Epi-Rez 507 is more than 88 parts, the resin after curing is gel-like and weak, and when the amount is less than 80 parts, the composition cures to a brittle, easily cracked material.

The liquid rubber component includes natural rubbers, and synthetic polymers of conjugated diolefins, such as polybutadiene, butadiene-styrene copolymers, butadiene-acrylonitrile copolymers, polymers and copolymers of methylpentadiene; polymeric forms of chlorine substitution products of conjugate diolefins, i.e., polychloroprene; polymers of non-conjugated systems, i.e., polyisobutylene and copolymers of isobutylene and isoprene; condensation polymers of the polysulfide type and polyurethane. The preferred rubber component is a copolymer of butadiene and acrylonitrile because it endows the sealing composition with improved adhesive properties. The amount of rubber component used in the composition ranges from about 5 to 30 parts by weight per hundred parts of epoxy resin. The higher proportions of rubber give a softer material and do not provide the desirable degree of adhesion.

Suitable bulk fillers include asbestine, powdered alumina and calcium carbonate. The viscosity control agents may be selected from a variety of commercially-available fine-size silicas, such as Cab-O-Sil M5, Hi-Sil 233 or Syloid 244.

The curing agents employed include amides, and amines and mixtures of amines. The amines have the following structure

$$R_2N-(CH_2)_m-[NH(CH_2)_n]_p-NR_2$$

where $m$ and $n$ each are integers having a value of 1 to 6, $p$ has a value of 0 to 6, and R is hydrogen or a low alkyl group having 1 to 4 carbon atoms, such as methyl, ethyl, propyl and butyl, said amine or mixtures thereof having at least two active hydrogens. Illustrative amines include ethylene diamine, diethylene triamine, triethylene tetramine, tetraethylene pentamine, and 3-diethylamine-1-propylamine.

Suitable amines are those derived by condensing a fatty acid and an alkylene diamine having the structure set out above. A particularly effective curing agent is "Epi-Cure 855" which is the reaction product of equimolar amounts of tall oil fatty acid and tetraethylene pentamine.

The amount of curing agent used is such that sufficient reactive hydrogens are available to completely react with the epoxidized groups in the epoxy resins. A slight excess of curing agent is tolerable to insure complete reaction. The amount of filler may be varied and will depend upon the viscosity of the sealing composition. Generally the amount will range between 35 and 70 parts by weight per hundred parts of epoxy resin. The viscosity control agent may range between about 2 and 10 parts by weight per hundred parts of epoxy resin. Experiments have shown that about 4 to 6 parts by weight of this agent develops proper thixotropy.

The invention is illustrated in greater detail by the following specific examples:

*Example 1*

| Ingredient: | Grams |
| --- | --- |
| Epi-Rez 510 | 12 |
| Epi-Rez 507 | 88 |
| Magnesium-silicate (Asbestine) | 46 |
| 65% Butadiene-35% Acrylonitrile Copolymer (Hycar 1312) | 10 |
| Fine size silica (Cab-O-Sil M5) | 6 |

The Epi-Rez 510 and 507 were blended together by stirring, the asbestine was thereafter added and the mixture was thoroughly blended while the temperature was maintained below 100° F. The butadiene-acrylonitrile copolymer was then added to the mix while it was continuously stirred and finally, the silica was incorporated and the entire mixture was stirred until it appeared homogeneous throughout. The composition was cured in 35 hours at room temperature by incorporating 50 grams of Epicure 855.

The following Examples 2 to 7 were prepared according to the procedure described in Example 1. In each example, a base was prepared which consisted of the following components:

| Component: | Grams |
|---|---|
| Epi-Rez 510 | 12 |
| Epi-Rez 507 | 88 |
| Asbestine | 46 |
| Cab-O-Sil M5 | 6 |

The base modified by adding the various liquid rubber components and curing agents as follows:

| Example No. | | Grams | Curing agent | Grams |
|---|---|---|---|---|
| 2 | Polychloroprene latex containing 52.5% solids, minimum. | 10 | Epicure 885 | 60 |
| 3 | Polysulfide (Thiokol LP-3) | 10 | ____do____ | 60 |
| 4 | 65% butadiene-35% acrylonitrile copolymer | 10 | ____do____ | 60 |
| 5 | Polychloropene latex containing 52.5% solids, minimum. | 10 | Tetraethylene pentamine | 10 |
| 6 | Polysulfide (Thiokol LP-3) | 10 | ____do____ | 10 |
| 7 | 65% butadiene-35% acrylonitrile copolymer | 10 | ____do____ | 10 |

Examples 2 and 5 had a pot life of two hours, while the compositions of the other examples had a pot life of four hours plus. The increased amount of Epi-Cure 855 from 50 parts per hundred parts of resin (Example 1) to 60 parts per hundred parts of resin reduced the cure time at room temperature to 30 hours. The compositions containing tetraethylene pentamine cured overnight. Adhesion of all formulations was excellent for paper to paper, paper to black iron and zinc plate to black iron. The addition of Hycar 1312 showed definite improvement over the other rubber components with respect to adhesion.

Example 8 illustrates the change in viscosity which is brought about by the addition of a fine size silica as a viscosity control agent:

*Example 8*

A base was prepared consisting of the following materials:

| Component: | Grams |
|---|---|
| Epi-Rez 510 | 12 |
| Epi-Rez 507 | 88 |
| Asbestine | 46 |

The viscosity of the batch was 3500 centipoises as measured with a Brookfield LVT–5X viscometer with a No. 4 spindle at 60 r.p.m. and 78° F. After 4 grams of silica (Cab-O-Sil M5) were added, the viscosity, as measured by the same instrument at 78° F. and 6 r.p.m., was 110,000 centipoises.

The final viscosity of the sealing composition will depend upon the end use to which it will be put. For sealing metal-fiber drum components, the viscosity should range between about 75,000 and 200,000 centipoises as measured with a Brookfield LVT–5X viscometer with a No. 4 spindle at 6 r.p.m. and 78° F. Compositions having a viscosity below 75,000 cps. are too fluid and will not stay in place while those having a viscosity above 200,000 cps. are difficult to work with.

Another group of experiments were carried out in which the proportions and components of the sealing composition were varied. A base for each composition was prepared which consisted of the following:

| Component: | Grams |
|---|---|
| Epi-Rez 510 | 12 |
| Epi-Rez 507 | 88 |
| Asbestine | 46 |
| Cab-O-Sil M5 | 4 |

The following were then added into individual base compositions. Each composition was then cured with 10 grams of tetraethylene pentamine.

| Example No. | Rubber Component | Grams |
|---|---|---|
| 9 | 65% butadiene 35% acrylonitrilecopolymer | 30 |
| 10 | ____do____ | 10 |
| 11 | Polysulfide (Thiokol LP-3) | 30 |
| 12 | ____do____ | 10 |
| 13 | Polyurethane containing between 3.5 to 4.5% of active—NCO groups. | 20 |
| 14 | ____do____ | 10 |
| 15 | Polychloroprene latex containing 52.5% solids, minimum. | 20 |
| 16 | ____do____ | 10 |

All compositions showed excellent adhesion on paper to paper, paper to zinc plate, paper to black iron, and zinc plate to black iron. The larger amounts of rubber component in Examples 9, 11, 13 and 15 did not show increased adhesion although they did display increased flexibility. The pot life of the compositions of Examples 9 to 12 was 4 hours and 2 hours for the compositions of Examples 13 to 16. The use of tetraethylene pentamine provided complete cure overnight at room temperature.

In order to determine the sealing properties of the compositions of this invention, tests were conducted according to ICC specification 17E on a metal-fiber drum in which the sealing composition was used. The composition was placed in the surface between a metal and the wall of the drum body in seamed relationship. Specifically, the drum consisted of a combination of a light gauge steel body shell having a resin-bonded mechanical side seam firmly held in place inside a multi-ply fiber drum body cylinder, and with fiber-reinforced metal lids secured to the combination body cylinder metal chime hoops, beaded and crimped with the sealing composition of this invention to form a liquid tight seam. One head was equipped with standard fittings for filling, emptying and venting.

Three tests were carried out: (a) drop test; (b) vibration and incline impact test and (c) hydrostatic pressure test. Test (a) was carried out by dropping the drum filled with water to 55-gallon capacity from a height of 4 feet onto solid concrete so as to strike diagonally on the chime. Additional drop tests were carried out on other parts which were considered weaker than the chime. Three drums were dropped diagonally on the top, three were dropped diagonally on the bottom and three were dropped on the flat side. All drums satisfactorily passed each of these tests.

In test (b), a drum filled with water to 55-gallon capacity must be capable of withstanding vibration on a table angled in such manner so that all horizontal motion shall be restricted and only vertical motion allowed. The test is performed for one hour and using an amplitude of one inch at a frequency that causes the test drum to be raised from the floor of the table to such a degree that a piece of paper or flat steel strap or tape can be passed between the table and the drum. The results of three drums subjected to this test were satisfactory.

Test (c) was carried out by subjecting the drum to hydrostatic pressure of 15 p.s.i.g. for 5 minutes. After an elapsed time of 5 minutes, three drums sustained this test. Another drum sustained pressure of 20 p.s.i.g. for 5 minutes. A fifth drum was taken to 26 p.s.i.g. but ultimate failure resulted by increasing the pressure steadily after a successful 5-minute test at 15 p.s.i.g. In this case the top chime unfolded at the point of failure.

While the sealing compositions of this invention have been described with respect to particular use in metal-fiber drums, they are also amendable to uses where strong bonding is desired. For example, excellent adhesion was obtained in bonding paper to paper, paper to black iron, and zinc plate to black iron. The improved adhesive properties are attributable to the combination of the rubber component, particularly a nitrile-containing rubber component, and the epoxy resin.

We claim:

1. A sealing composition comprising (I) 12 to 20 parts by weight of an epoxy resin obtained by reacting epichlorohydrin and bis(4 - hydroxyphenyl) dimethyl methane, (II) 88 to 80 parts by weight of an epoxy resin derived by reacting resin (I) and ethylene glycol and (III) 10 to 30 parts by weight based on the combined weight of resins of (I) and (II) of a liquid rubber component selected from the group consisting of butadiene-acrylonitrile copolymer, polysulfide, and polychloroprene.

2. A composition according to claim 1 wherein the rubber component is a butadiene-acrylonitrile copolymer.

3. A composition according to claim 1 wherein the rubber component is polysulfide.

4. A composition according to claim 1 wherein the rubber component is polychloroprene.

5. A composition according to claim 1 wherein the sealing composition contains a curing agent for the epoxy resin.

6. A composition according to claim 5 wherein the curing agent is an amide derived by condensing equimolar amounts of tall oil fatty acid and tetraethylene pentamine.

References Cited

UNITED STATES PATENTS

| | | | |
|---|---|---|---|
| Re. 25,625 | 7/1964 | Been | 260—837 |
| 2,858,291 | 10/1958 | McAdam | 260—830 |
| 3,075,871 | 1/1963 | Barlet | 260—830 |
| 3,124,548 | 3/1964 | Yaroch | 260—19 |
| 3,144,428 | 8/1964 | Kost | 260—837 |

FOREIGN PATENTS

| | | |
|---|---|---|
| 524,051 | 4/1958 | Canada. |
| 1,149,324 | 12/1958 | France. |
| 1,234,685 | 10/1960 | France. |
| 763,347 | 12/1956 | Great Britain. |
| 922,581 | 3/1960 | Great Britain. |

MURRAY TILLMAN, *Primary Examiner.*

P. LIEBERMAN, *Assistant Examiner.*